United States Patent
Shen et al.

(10) Patent No.: US 12,400,070 B2
(45) Date of Patent: Aug. 26, 2025

(54) METHOD AND DEVICE FOR OUTPUTTING INSURANCE OUTBOUND CONVERSATION INFORMATION BASED ON GENERATIVE LARGE LANGUAGE MODEL

(71) Applicant: Beijing Waterdrop Technology Group Co., Ltd., Beijing (CN)

(72) Inventors: Peng Shen, Beijing (CN); Lei Xu, Beijing (CN); Ting Huang, Beijing (CN); Yinfeng Li, Beijing (CN); Hailun Liu, Beijing (CN); Zhizhuo Wang, Beijing (CN); Mingxing Huang, Beijing (CN); Xiaobo Zhou, Beijing (CN)

(73) Assignee: Beijing Waterdrop Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/928,174

(22) Filed: Oct. 28, 2024

(65) Prior Publication Data
US 2025/0165700 A1    May 22, 2025

(30) Foreign Application Priority Data
Nov. 17, 2023   (CN) .......................... 202311532963.1

(51) Int. Cl.
*G06F 40/166* (2020.01)
*G06F 40/35* (2020.01)
*G06Q 40/08* (2012.01)

(52) U.S. Cl.
CPC ............ *G06F 40/166* (2020.01); *G06F 40/35* (2020.01); *G06Q 40/08* (2013.01)

(58) Field of Classification Search
CPC ........ G06F 40/20; G06F 40/166; G06F 40/35; G06Q 40/08; G06N 20/00; G06N 3/092
See application file for complete search history.

(56) References Cited

U.S. PATENT DOCUMENTS 11,848,101 B2 * 12/2023 Shah ....................... G06Q 50/22
2017/0206891 A1 * 7/2017 Lev-Tov ............... G10L 15/063
(Continued)

FOREIGN PATENT DOCUMENTS

| CN | 110909137 A | 3/2020 |
|---|---|---|
| CN | 113962213 A | 1/2022 |

OTHER PUBLICATIONS

Lee et al, "Deduplicating Training Data Makes Language Models Better", published: May 27, 2022, publisher: Association for Computational Linguistics, pp. 8424-8445 (Year: 2022).*

*Primary Examiner* — Wilson W Tsui
(74) *Attorney, Agent, or Firm* — George D. Morgan

(57) ABSTRACT

A method and a device for outputting insurance outbound conversation information based on a generative large language model are provided, aiming to solve the problem of low accuracy in the output of insurance outbound conversation information based on generative large language models, which relates to the technical field of data processing. The method includes: acquiring conversation information in outbound consultation on an insurance product; classifying the conversation information with a trained generative large language model to obtain a classification result of the conversation information, where the generative large language model is trained with a training sample set obtained by performing deduplication on crossing area in formulated conversation sample data; and determining the insurance outbound conversation information for the outbound consultation based on the classification result and outputting the insurance outbound conversation information.

5 Claims, 4 Drawing Sheets

(56) References Cited

U.S. PATENT DOCUMENTS

| | | |
|---|---|---|
| 2018/0241647 A1 | 8/2018 | Baracaldo Angel et al. |
| 2021/0295203 A1* | 9/2021 | Liao ........................ G06N 3/006 |
| 2023/0259705 A1* | 8/2023 | Tunstall-Pedoe .... G06N 3/0499 |
| | | 704/9 |
| 2024/0143289 A1* | 5/2024 | Pandita ................... G10L 15/26 |
| 2024/0160902 A1* | 5/2024 | Padgett ................ G06N 3/0895 |
| 2024/0249318 A1* | 7/2024 | Spiegel ................... H04L 51/02 |
| 2024/0281891 A1* | 8/2024 | Fields ..................... G06Q 40/08 |
| 2024/0296284 A1* | 9/2024 | Shahgoshtasbi ...... G06F 40/166 |
| 2024/0406166 A1* | 12/2024 | Bell ........................ G16H 15/00 |
| 2024/0419943 A1* | 12/2024 | Khasanova ............ G06N 3/045 |

* cited by examiner

METHOD AND DEVICE FOR OUTPUTTING INSURANCE OUTBOUND CONVERSATION INFORMATION BASED ON GENERATIVE LARGE LANGUAGE MODEL

CROSS-REFERENCE TO RELATED APPLICATIONS

The application claims priority to Chinese patent application No. 202311532963.1, filed on Nov. 17, 2023, the entire contents of which are incorporated herein by reference.

TECHNICAL FIELD

This application relates to the technical field of data processing, and in particular to a method and a device for outputting insurance outbound conversation information based on a generative large language model.

BACKGROUND

With the increasing variety of insurance product sale modes, users can inquire about various insurance information through conversations with a call robot. The call robot, developed by insurance companies, employs intelligent algorithms to engage in conversations and provide standardized responses according to input from users.

The existing intelligent algorithms in use generally employ machine learning models that have been trained with conversations. These models can perform prediction and matching on insurance policy text, insurance premium as well as conversation content in advance, thereby delivering responses to users. Nevertheless, using extensive conversation texts and insurance knowledge in conversations as samples for training the model will actually reduce the precision of the model in terms of prediction and classification, and increase the training time, which in turn reduces the accuracy in outputting insurance outbound information based on generative large language models.

SUMMARY

In view of this, a method and a device for outputting insurance outbound conversation information based on a generative large language model are provided according to this application, aiming to solve the problem of low accuracy in the output of insurance outbound conversation information based on generative large language models.

According to an aspect of this application, a method for outputting insurance outbound conversation information based on a generative large language model is provided. The method includes:
acquiring conversation information in outbound consultation on an insurance product;
classifying the conversation information with a trained generative large language model to obtain a classification result of the conversation information, where the generative large language model is trained with a training sample set obtained by performing deduplication on crossing area in formulated conversation sample; and
determining the insurance outbound conversation information for the outbound consultation based on the classification result and outputting the insurance outbound conversation information.

In one embodiment, before the classifying the conversation information with a trained generative large language model to obtain a classification result of the conversation information, the method further includes:
acquiring historical conversation information, and extracting pieces of conversation sample data from the historical conversation information according to the length of a text sliding window; and
determining the crossing area in the conversation sample data and performing deduplication on the crossing area to obtain the training sample set, to train the generative large language model with the training sample set. The crossing area includes time crossing area and text content crossing area.

In one embodiment, the determining the crossing area in the conversation sample data and performing deduplication on the crossing area to obtain the training sample set includes:
performing text analysis on the conversation sample data, comparing text of previous conversation sample data with text of the conversation sample data, and determining the text content crossing area;
deleting target text content corresponding to the text content crossing area, if the target text content is marked as modularized words; and
performing deduplication on target text content corresponding to the text content crossing area, if the target text content is marked as non-modularized words.

In another embodiment, the method includes:
formulating the generative large language model to be trained and acquiring the training sample set that has performed deduplication; and
training the generative large language model with the training sample set and completing the training of the generative large language model when a loss value of the generative large language model matches a preset loss threshold. The loss value is calculated when the generative large language model is trained with the conversation sample data which has performed deduplication on target text content.

In another embodiment, before the determining the crossing area in the conversation sample data, the method further includes:
de-identifying label text corresponding to a sensitive label while the sensitive label is detected in the conversation sample data. The sensitive label is obtained by marking the conversation sample data according to identity sensitive information and insurance amount sensitive information.

In another embodiment, the determining the insurance outbound conversation information for the outbound consultation based on the classification result and outputting the insurance outbound conversation information includes:
searching for a conversation reply keyword matching the classification result from a preset product conversation word library, wherein the preset product conversation word library stores conversation reply keywords of various classification results; and
generating the insurance outbound conversation information containing the conversation reply keyword based on a conversation sentence formulation strategy and outputting the insurance outbound conversation information. The conversation sentence formulation strategy comprises ways to formulate sentences with supplementary text of various genres and parts of speech in combination with the conversation reply keyword.

In another embodiment, the method includes:

analyzing intent information of the conversation reply keyword if next round of conversation information still contains the conversation reply keyword, where the intent information indicates a secondary consultation object of the insurance product; and retrieving the secondary consultation object that matches the intent information from an insurance product information consultation database, where the information consultation database stores secondary consultation objects corresponding to various intent information.

According to another aspect of this application, a device for outputting insurance outbound conversation information based on a generative large language model is provided. The device includes an acquiring module, a processing module, and a determining module.

The acquiring module is configured to acquire conversation information in outbound consultation on an insurance product.

The processing module is configured to classify the conversation information with a trained generative large language model to obtain a classification result of the conversation information. The generative large language model is trained with a training sample set obtained by performing deduplication on crossing area in formulated conversation sample data.

The determining module is configured to determine the insurance outbound conversation information for the outbound consultation based on the classification result and output the insurance outbound conversation information.

The acquiring module is further configured to acquire historical conversation information, and extract pieces of conversation sample data from the historical conversation information according to the length of a text sliding window.

The determining module is further configured to determine the crossing area in the conversation sample data and perform deduplication on the crossing area to obtain the training sample set, to train the generative large language model with the training sample set. The crossing area includes time crossing area and text content crossing area.

The determining module is further configured to: perform text analysis on the conversation sample data and compare text of previous conversation sample data with text of the conversation sample data to determine the text content crossing area; delete target text content corresponding to the text content crossing area, if the target text content is marked as modularized words; and perform deduplication on target text content corresponding to the text content crossing area, if the target text content is marked as non-modularized words.

The device further includes a formulating module and a training module.

The formulating module is configured to formulate the generative large language model to be trained and acquire the training sample set that has performed deduplication.

The training module is configured to train the generative large language model with the training sample set and complete the training of the generative large language model when a loss value of the generative large language model matches a preset loss threshold. The loss value is calculated when the generative large language model is trained with the conversation sample data which has performed deduplication on target text content.

The processing module is further configured to de-identify label text corresponding to a sensitive label while the sensitive label is detected in the conversation sample data. The sensitive label is obtained by marking the conversation sample data according to identity sensitive information and insurance amount sensitive information.

The determining module is further configured to: search for a conversation reply keyword matching the classification result from a preset product conversation word library, where the preset product conversation word library stores conversation reply keywords of various classification results; and generate the insurance outbound conversation information containing the conversation reply keyword based on a conversation sentence formulation strategy and output the insurance outbound conversation information. The conversation sentence formulation strategy includes ways to formulate sentences with supplementary text of various genres and parts of speech in combination with the conversation reply keyword.

The device further includes an analyzing module and a retrieving module.

The analyzing module is configured to analyze intent information of the conversation reply keyword if next round of conversation information still contains the conversation reply keyword. The intent information indicates a secondary consultation object of the insurance product.

The retrieving module is configured to retrieve the secondary consultation object that matches the intent information from an insurance product information consultation database. The information consultation database stores secondary consultation objects corresponding to various intent information.

According to another aspect of this application, a storage medium is provided. The storage medium stores at least one executable instruction. The executable instruction causes the processor to execute the foregoing method for outputting insurance outbound conversation information based on a generative large language model.

According to another aspect of this application, a terminal is provided. The terminal includes a processor, a memory, a communications interface, and a communications bus. The processor, the memory, and the communications interface communicate with each other through the communications bus.

The memory is configured to store at least one executable instruction, which causes the processor to perform the method for outputting insurance outbound conversation information based on a generative large language model.

The foregoing technical solutions provided in the embodiments of this application have at least the following advantages.

A method and a device for outputting insurance outbound conversation information based on a generative large language model are provided according to this application. In the embodiments of this application, in comparison with the conventional technology, conversation information in outbound consultation on an insurance product is acquired. The conversation information is classified with a trained generative large language model to obtain a classification result of the conversation information. the generative large language model is trained with a training sample set obtained by performing deduplication on crossing area in formulated conversation sample data. The insurance outbound conversation information for the outbound consultation is determined based on the classification result and then is outputted. Deduplication is performed on crossing area in the conversation sample data, and therefore accuracy in classification can be improved. In this way, the training of the model can speed up and accuracy in the output of insurance outbound conversation information based on generative large language models can be improved.

Merely a summary of the technical solutions of this application has described above. Embodiments of this application will be detailed below for a better understanding of the technical means of this application before implemented according to the specification, and further for making the foregoing and other objects, features, and advantages of this application understandable.

BRIEF DESCRIPTION OF DRAWINGS

The detailed description of the preferred embodiments provided below can elucidate additional advantages and benefits to those skilled in the art. The drawings are exclusively for the purpose of illustrating the preferred embodiments instead of imposing limitations on this application. Additionally, identical reference symbols are employed throughout the drawings to represent the same components. In the drawings.

DETAILED DESCRIPTION OF THE EMBODIMENTS

Figure 1:
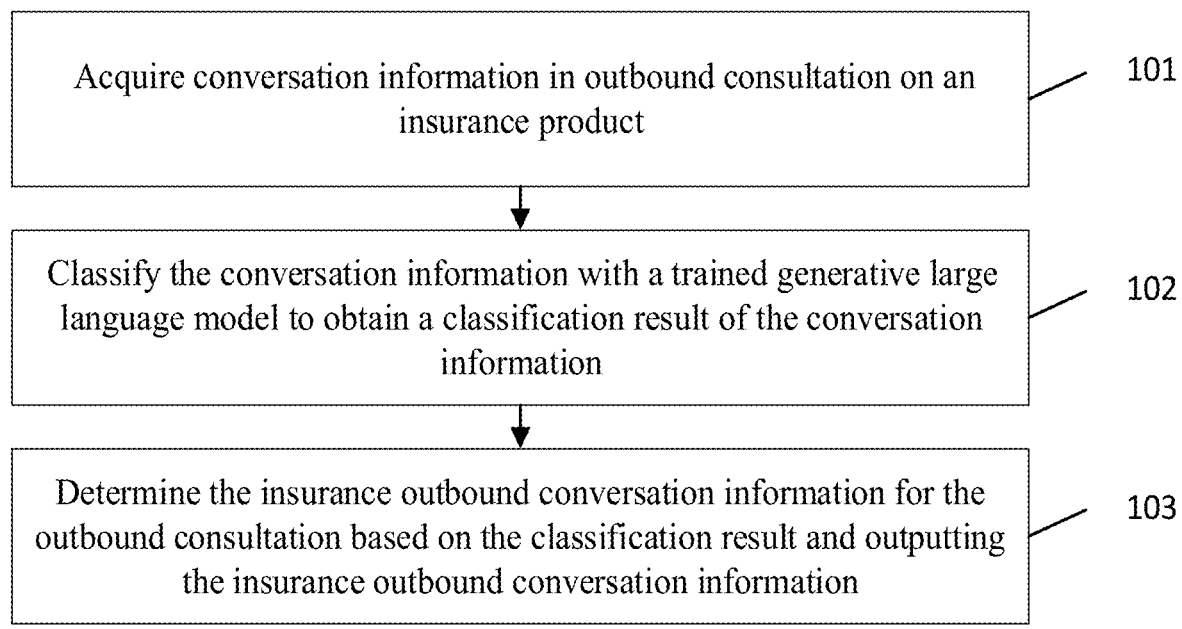
FIG. 1 is a flowchart illustrating a method for outputting insurance outbound conversation information based on a generative large language model according to an embodiment of this application.

The detailed description of the embodiments of this application will be provided below with reference to the drawings. Although the embodiments of the present disclosure have been shown in the drawings, it should be understood that the present disclosure can be implemented in various forms and should not be limited to the embodiments described herein. Instead, the provision of these embodiments serves to facilitate a comprehensive understanding of this application and to fully convey the scope of this application to those skilled in the art.

A method for outputting insurance outbound conversation information based on a generative large language model is provided according to an embodiment of this application. As shown in FIG. 1, the method includes the following steps 101 to 103.

In 101, conversation information in outbound consultation on an insurance product is acquired.

The embodiments of this application are applied to intelligent conversation scenarios about insurance products, which may be artificial intelligence conversation scenarios, including but not limited to telephone conversations and social platform conversations involving intelligent robots. The current execution terminal, which may be a cloud server or a terminal server, serves as a processing end of the insurance outbound conversation information, to process conversation content of different insurance agents or chatbots. During the conversations with users through telephone agents or chatbots, the current execution terminal acquires conversation information about insurance products. The conversation information includes content of the conversation generated by user inquiries and content of the conversation generated by users responding to specific conversational sentences, which are not limited herein.

It should be noted that the current execution terminal can acquire the conversation information in real-time during the outbound consultation or retrieve the corresponding conversation content from conversation logs, to adapt to various conversation scenarios, which are not limited herein. In an embodiment, the current execution terminal acquires the conversation information in real time, and then acquires insurance outbound conversation information to be sent through steps 102 to 103. In another embodiment, the current execution terminal retrieves the corresponding conversation content from conversation logs, and then compare the insurance outbound conversation information acquired through steps 102 to 103 with obtained reply content to verify the accuracy of the reply. The embodiments of this application do not impose any limitations on this.

In 102, the conversation information is classified with a trained generative large language model to obtain a classification result of the conversation information.

In the embodiments of this application, the current execution terminal classifies the acquired conversation information with the trained generative large language model. That is, the conversation information as the input is classified with the trained generative large language model, and then the classification result as the output is obtained. The generative large language model is trained with a training sample set obtained by performing deduplication on crossing area in formulated conversation sample data. In the embodiments of this application, the formulated conversation sample data is a statement sample of various conversation possibilities formulated by the developer for diverse scenarios, and may be formulated manually or formulated with a natural language algorithm, which is not specifically limited in the embodiments of this application. Additionally, the generative large language model in this application may be a large model capable of open-source compilation, for example, the open-source large model ChatGLM2-6B. This application does not impose any limitations on this.

It should be noted that, in order to create a conversation that resembles a dialog by a real person, tone words, context-connecting words, and identity-related information are appropriately added to the formulated sentences. Training the generative large language model with such formulated sentences as the conversation sample data unavoidably increases burdens learning by the model and reduces the accuracy of the learning. In this instance, statements may be formulated via conversations with the inclusion of Prompt content. This application does not impose any limitations on this. The generative large language model is trained with the training sample set obtained by eliminating duplicate dada from the formulated conversation sample data. In addition, the training sample set may be cleaned and filtered with a BERT model, thereby improving the accuracy of training. This application does not impose any limitations on this.

In 103, the insurance outbound conversation information for the outbound consultation is determined based on the classification result and then is outputted.

In the embodiments of this application, the classification result obtained by classifying the conversation information with the generative large language model includes but is not limited to word types for classifying insurance products according to the conversation content, such as purchase classification, consultation classification, underwriting classification, etc., so as to determine the insurance outbound conversation information for outbound consultation on insurance products by users. For example, sentence content corresponding to the purchase classification is retrieved as the insurance outbound conversation information. This application does not impose any limitations on this.

In another embodiment of this application, for further explanation and limitation, before the conversation information is classified with the trained generative large language model to obtain the classification result of the conversation information, the method further includes:

acquiring historical conversation information, and extracting pieces of conversation sample data from the historical conversation information according to the length of a text sliding window; and determining the crossing area in the conversation sample data and performing deduplication on the crossing area to obtain the training sample set, to train the generative large language model with the training sample set.

In order to effectively train the model with the training sample set performed the deduplication based on construction, the current execution terminal first acquires the historical conversation information. Here, the historical conversation information is the conversation sentences for formulating the conversation sample data, which is extracted through a sliding window. To extract the conversation sample data through the sliding window, text sliding window lengths for different conversation scenarios are pre-configured, and multiple pieces of conversation sample data are extracted according to the text sliding window lengths. Here, the text sliding window length may be a word length or a time length. For example, the conversation text is extracted by a length of 5 words, which serves as the text sliding window length. Alternatively, the conversation text is extracted by words read in 10 seconds, which serve as the length of the text sliding window. This application does not impose any limitations on this.

Figure 2:
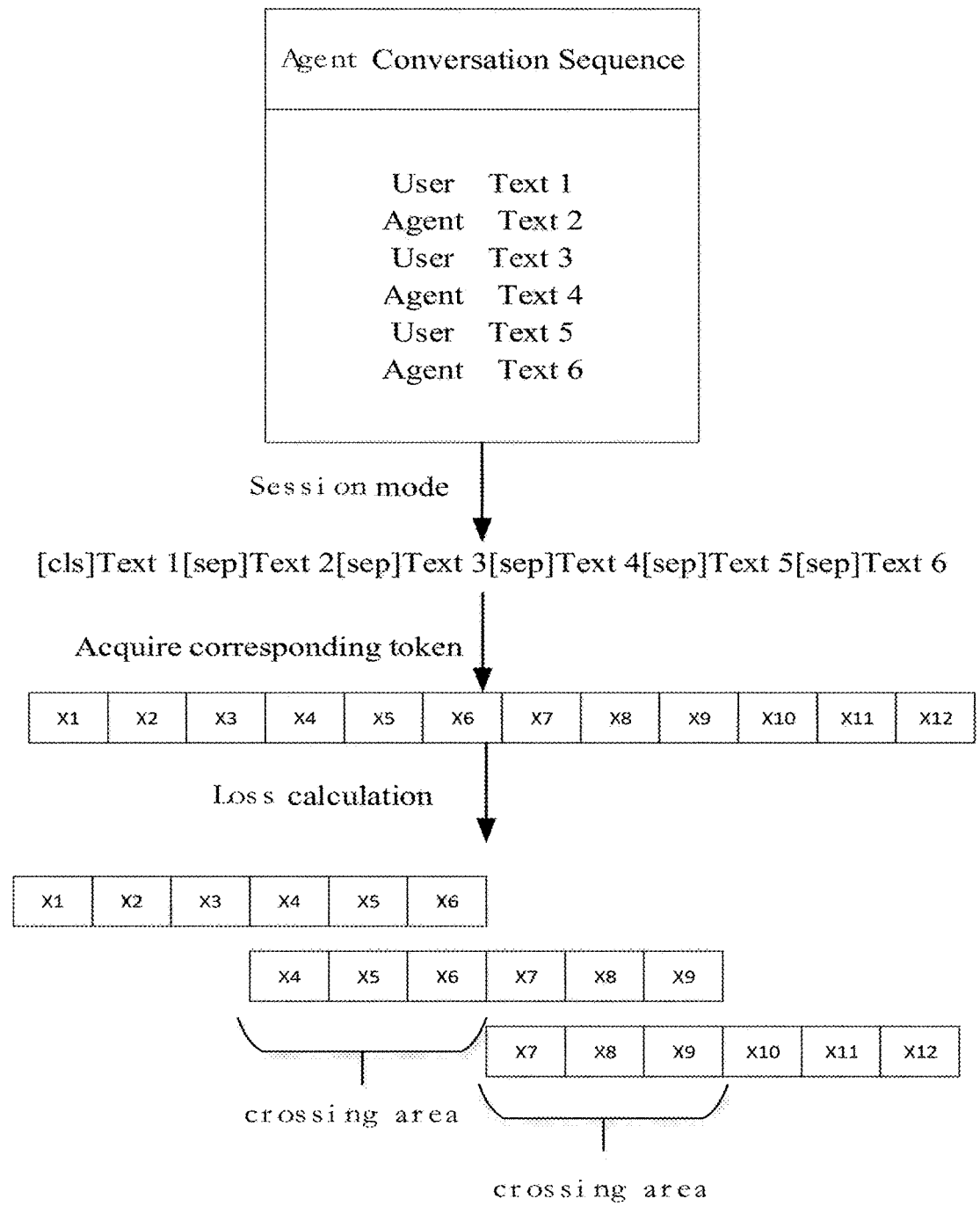
FIG. 2 is a schematic diagram illustrating a solution to de-duplication on a text training data according to an embodiment of this application.

It should be noted that in the embodiments of this application, the conversation sentences extracted though the sliding window may repeat, as shown in FIG. 2. Further, the length of the text sliding window may be set as the word length or time length, and accordingly the crossing area includes time crossing area and text content crossing area. The crossing area is determined as the sliding window slides, and then is deduplicated to obtain the training sample set. This application does not impose any limitations on this.

In another embodiment of this application, for further explanation and limitation, the determining the crossing area in the conversation sample data and performing deduplication on the crossing area to obtain the training sample set includes:

performing text analysis on the conversation sample data, comparing text of previous conversation sample data with text of the conversation sample data, and determining the text content crossing area;

deleting target text content corresponding to the text content crossing area, if the target text content is marked as modularized words; and performing deduplication on target text content corresponding to the text content crossing area, if the target text content is marked as non-modularized words.

In order to effectively determine the duplicate text data and improve the accuracy in training the model, the current execution terminal first parses the conversation sample data to determine the text words. As shown in FIG. 2, the current execution terminal performs word splitting on the conversation sample data and determines the identifier of each text word. After extracted by the sliding window length, the text words between extracted conversation sample data are compared. That is, the text words of the previous conversation sample data are compared with the text words of the current conversation sample data to determine the repeating text data belonging to the same content.

It should be noted that in order to improve the effectiveness of text content and avoid using words such as tone words and identity words that affect the effectiveness of model training as sample data, the current execution terminal modularizes the text content in the historical text information in advance, and singles out modular words that are useless for learning, so as to delete them when formulate the text sample data. Specifically, target text content corresponding to the duplicate text data that has marked as modularized words are deleted, thereby training the model with the text sample data without duplicate text data. Deduplication is performed on target text content corresponding to the duplicate text data that has marked as non-modularized words, thereby training the model with the text sample data without duplicate words.

In another embodiment of this application, for further explanation and limitation, the method further includes:

formulating the generative large language model to be trained and acquiring the training sample set that has performed deduplication; and training the generative large language model with the training sample set and completing the training of the generative large language model when a loss value of the generative large language model matches a preset loss threshold.

In order to train the model with the training sample set that performed deduplication and thus improve the accuracy of classifying the conversation, the current execution terminal first formulates the generative large language model to be trained. After the generative large language model has formulated, the formulated training sample set is obtained and the generative large language model is trained with this training sample set. Further, the loss value is calculated during the training. The loss value is calculated when the generative large language model is trained with the conversation sample data which has performed deduplication on target text content, so as to complete the training of the generative large language model when the loss value matches the preset loss threshold.

It should be noted that while the model is trained with the training sample set that performed deduplication, the loss value is calculated after duplicate words has removed. The loss value may be calculated from a loss function, which is not limited herein.

In another embodiment of this application, for further explanation and limitation, before the crossing area in the conversation sample data has determined, the method further includes:

de-identifying label text corresponding to a sensitive label while the sensitive label is detected in the conversation sample data.

In order to make the training text-specific, the current execution terminal detects whether the conversation sample data contains sensitive labels before determining the crossing area. Here, the sensitive label is obtained by marking the conversation sample data according to identity sensitive information and insurance amount sensitive information. That is, the identity sensitive information and insurance amount sensitive information may be pre-labeled on the conversation sample data manually or through word recognition. Specifically, the ID card number may be marked as sensitive, and the insurance amount above 100,000 yuan may be marked as sensitive, which is not limited in the embodiments of this application. In addition, when detected that the conversation sample data includes a sensitive label, the label text with the sensitive label is de-identified. Here, de-identification refers to selecting specific words and deleting their sensitive identifiers, for example, replacing the ID card number with a constant meaningless digital string 1111111111111111111, which is not limited in the embodiments of this application.

In another embodiment of this application, for further explanation and limitation, the determining the insurance outbound conversation information for the outbound consultation based on the classification result and outputting the insurance outbound conversation information includes:

searching for a conversation reply keyword matching the classification result from a preset product conversation word library; and generating the insurance outbound conversation information containing the conversation reply keyword based on a conversation sentence formulation strategy and outputting the insurance outbound conversation information.

In order to make the conversation reply flexible and improve the accuracy of conversation replies in different conversation scenarios, the current execution terminal searches for conversation reply keyword that matches the classification result from the preset product conversation word library. The preset product conversation word library stores conversation reply keywords of various classification results. For example, the classification result is product classification, and accordingly the preset product conversation word library stores conversation reply keywords matching the product classification, such as the insurance product 1, insurance amount, term, underwriting conditions, etc., which are not limited in the embodiments of the present application. After the conversation reply keyword is determined, the insurance outbound conversation information containing the conversation reply keyword is generated following the conversation sentence formulation strategy. The conversation sentence formulation strategy includes ways to formulate sentences with supplementary text of various genres and parts of speech in combination with the conversation reply keyword. The supplementary text is the text content for formulating the conversation reply keywords into sentences. For example, the conversation reply keywords include the insurance product 1 and insurance amount of 1 million, and accordingly the supplementary text included in the conversation sentence formulation strategy is "Excuse me, would you like to consult about xxx?". The way to formulate a sentence based on the supplementary text is adding directly, and the corresponding insurance outbound conversation information is "Excuse me, would you like to consult about the insurance product 1 with an insurance amount of 1 million?". This application does not impose any limitations on this.

In another embodiment of this application, for further explanation and limitation, the method further includes:

analyzing intent information of the conversation reply keyword if next round of conversation information still contains the conversation reply keyword; and retrieving a secondary consultation object that matches the intent information from an insurance product information consultation database.

In order to improve the accuracy of conversation determination, after the insurance outbound conversation information is determined, the current execution terminal outputs the insurance outbound conversation information to the user through a terminal device, i.e., a telephone, and further receives a next round of conversation information inputted by the user based on the insurance outbound conversation information. The current execution terminal detects the determined conversation reply keyword in the next round of conversation information. The fact that the next round of conversation information contains the determined conversation reply keyword indicates that the user has an intention to consult about the insurance recommendation content in the reply keyword. Therefore, the intention information of the reply keyword is analyzed. The intent information indicates a secondary consultation object of the insurance product. The intent may be identified with a pre-trained BERT model based on the reply keyword. This application does not impose any limitations on this. In addition, after the intent information is identified, the secondary consultation object matching the intent information is retrieved from the information consultation database and then is outputted. The information consultation database stores secondary consultation objects corresponding to various intent information. The secondary consultation object may be the same as or different from the reply keyword, thereby retrieving insurance products according to the secondary consultation object. For example, the insurance outbound conversation information is "Excuse me, would you like to consult about the coverage of the insurance product a?", and the next round of conversation information is "Yes, I would like to consult about the insurance product a" inputted by the user. In this case, the next round of conversation information includes the reply keyword "the insurance product a", and the intention information is identified as consulting about the insurance product a. Therefore, the secondary consultation object matching the insurance product a, i.e., the relevant consultation content of the insurance product a, is retrieved from the information consultation database and is outputted. This application does not impose any limitations on this.

A method for outputting insurance outbound conversation information based on a generative large language model is provided according to this application. In the embodiments of this application, in comparison with the conventional technology, conversation information in outbound consultation on an insurance product is acquired. The conversation information is classified with a trained generative large language model to obtain a classification result of the conversation information. The generative large language model is trained with a training sample set obtained by performing deduplication on crossing area in formulated conversation sample data. The insurance outbound conversation information for the outbound consultation is determined based on the classification result and then is outputted. Deduplication is performed on crossing area in the conversation sample data, and therefore accuracy in classification can be improved. In this way, the training of the model can speed up and accuracy in the output of insurance outbound conversation information based on generative large language models can be improved.

Figure 3:
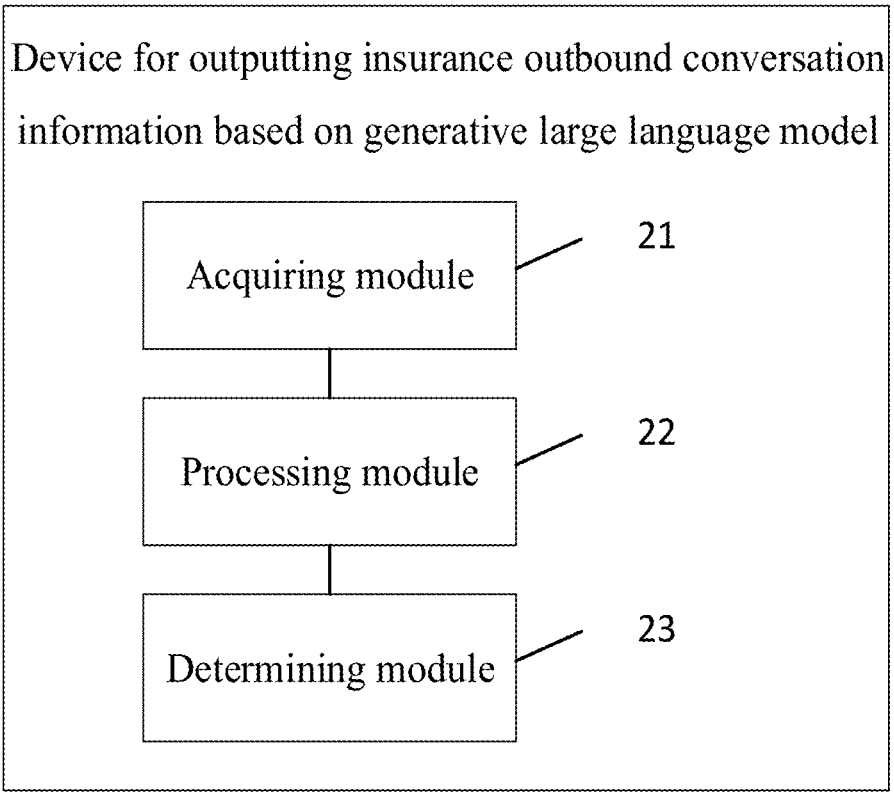
FIG. 3 is a block diagram illustrating a device for outputting insurance outbound conversation information based on a generative large language model according to an embodiment of this application.

Furthermore, a device for outputting insurance outbound conversation information based on a generative large language model is provided according to an embodiment of this application, as an implementation of the method shown in FIG. 1 above. As shown in FIG. 3, the device includes an acquiring module 21, a processing module 22, and a determining module 23.

The acquiring module 21 is configured to acquire conversation information in outbound consultation on an insurance product.

The processing module 22 is configured to classify the conversation information with a trained generative large language model to obtain a classification result of the conversation information. The generative large language model is trained with a training sample set obtained by performing deduplication on crossing area in formulated conversation sample data.

The determining module 23 is configured to determine the insurance outbound conversation information for the outbound consultation based on the classification result and output the insurance outbound conversation information.

The acquiring module is further configured to acquire historical conversation information, and extract pieces of conversation sample data from the historical conversation information according to the length of a text sliding window.

The determining module is further configured to determine the crossing area in the conversation sample data and perform deduplication on the crossing area to obtain the training sample set, to train the generative large language model with the training sample set. The crossing area includes time crossing area and text content crossing area.

The determining module is further configured to: perform text analysis on the conversation sample data and compare text of previous conversation sample data with text of the conversation sample data to determine the text content crossing area; delete target text content corresponding to the text content crossing area, if the target text content is marked as modularized words; and perform deduplication on target text content corresponding to the text content crossing area, if the target text content is marked as non-modularized words.

The device further includes a formulating module and a training module.

The formulating module is configured to formulate the generative large language model to be trained and acquire the training sample set that has performed deduplication.

The training module is configured to train the generative large language model with the training sample set and complete the training of the generative large language model when a loss value of the generative large language model matches a preset loss threshold. The loss value is calculated when the generative large language model is trained with the conversation sample data which has performed deduplication on target text content.

The processing module is further configured to de-identify label text corresponding to a sensitive label while the sensitive label is detected in the conversation sample data. The sensitive label is obtained by marking the conversation sample data according to identity sensitive information and insurance amount sensitive information.

The determining module is further configured to: search for a conversation reply keyword matching the classification result from a preset product conversation word library, where the preset product conversation word library stores conversation reply keywords of various classification results; and generate the insurance outbound conversation information containing the conversation reply keyword based on a conversation sentence formulation strategy and output the insurance outbound conversation information. The conversation sentence formulation strategy includes ways to formulate sentences with supplementary text of various genres and parts of speech in combination with the conversation reply keyword.

The device further includes an analyzing module and a retrieving module.

The analyzing module is configured to analyze intent information of the conversation reply keyword if next round of conversation information still contains the conversation reply keyword. The intent information indicates a secondary consultation object of the insurance product.

The retrieving module is configured to retrieve the secondary consultation object that matches the intent information from an insurance product information consultation database. The information consultation database stores secondary consultation objects corresponding to various intent information.

A device for outputting insurance outbound conversation information based on a generative large language model is provided according to this application. In the embodiments of this application, in comparison with the conventional technology, conversation information in outbound consultation on an insurance product is acquired. The conversation information is classified with a trained generative large language model to obtain a classification result of the conversation information. the generative large language model is trained with a training sample set obtained by performing deduplication on crossing area in formulated conversation sample data. The insurance outbound conversation information for the outbound consultation is determined based on the classification result and then is outputted. Deduplication is performed on crossing area in the conversation sample data, and therefore accuracy in classification can be improved. In this way, the training of the model can speed up and accuracy in the output of insurance outbound conversation information based on generative large language models can be improved.

According to another aspect of this application, a storage medium is provided. The storage medium stores at least one executable instruction. The executable instruction causes the processor to execute the foregoing method for outputting insurance outbound conversation information based on a generative large language model.

Figure 4:
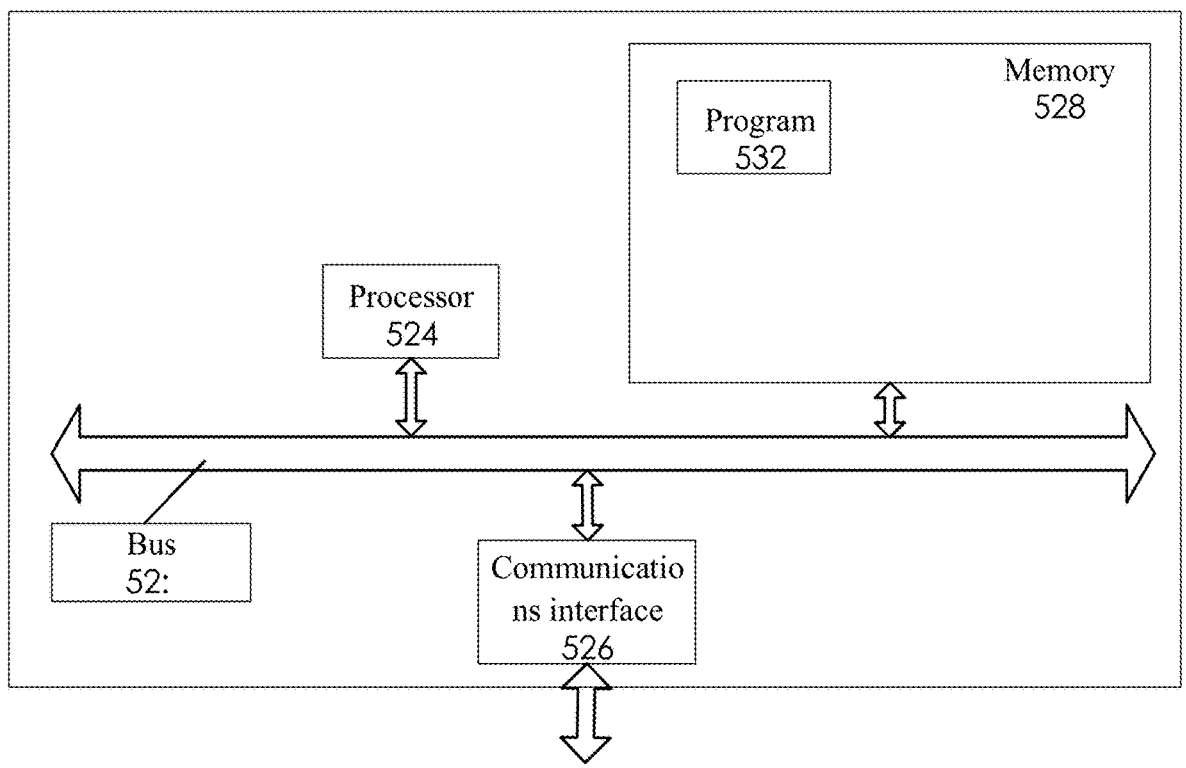
FIG. 4 is a schematic structural diagram illustrating a terminal according to an embodiment of this application.

FIG. 4 is a schematic structural diagram illustrating a terminal according to an embodiment of this application. The embodiments of this application do not impose limitations on implementation of the terminal.

As shown in FIG. 4, the terminal includes a processor 302, a communications interface 304, a memory 306, and a communications bus 308.

The processor 302, the communications interface 304, and the memory 306 communicate with each other through the communications bus 308.

The communications interface 304 is configured to communicate with other devices like a client terminal or server.

The processor 302 is configured to execute the program 310 to perform the method for outputting insurance outbound conversation information based on a generative large language model.

Specifically, the program 310 may include program codes, which include computer operation instructions.

The processor 302 may be a central processing unit (CPU), or an application specific integrated circuit (ASIC), or one or more integrated circuits configured to implement the embodiments of the present application. The one or more processors included in the terminal may be of the same type, i.e., one or more CPUs, or of different types, i.e., one or more CPUs and one or more ASICs.

The memory 306 is configured to store the program 310. The memory 306 may include a high-speed RAM memory, and may also include a non-volatile memory, i.e., at least one disk memory.

The program 310 causes the processor 302 to perform the following steps of:
    acquiring conversation information in outbound consultation on an insurance product;
    classifying the conversation information with a trained generative large language model to obtain a classification result of the conversation information, where the generative large language model is trained with a training sample set obtained by performing deduplication on crossing area in formulated conversation sample data; and determining the insurance outbound conversation information for the outbound consultation based on the classification result and outputting the insurance outbound conversation information.

Obviously, those skilled in the art should understand that the above modules or steps of the present application can be implemented by a general-purpose computing device, that is, may cluster on a single computing device or may be distributed on a network composed of multiple computing devices. Optionally, the modules or steps may be implemented with a program code executable by a computing device, which is stored in a storage device and executed by the computing device. In some cases, the steps shown or described may be performed in a different order than that shown here. Alternatively, the modules may be made into individual integrated circuit modules. Alternatively, the modules may be made into a single integrated circuit module. Thus, the present application is not limited to any particular combination of hardware and software.

The above description illustrates only the preferred embodiments of the present application and is not intended to limit the present application. For those skilled in the art, the present application may have various modifications and variations. Any modification, equivalent replacement, improvement, etc. made within the spirit and principle of the present application shall be included in the protection scope of the present application.

What is claimed is:

1. A method for outputting insurance outbound conversation information based on a generative large language model, comprising:

acquiring conversation information in outbound consultation on an insurance product;

classifying the conversation information with a trained generative large language model to obtain a classification result of the conversation information, wherein the generative large language model is trained with a training sample set obtained by performing deduplication on crossing area in formulated conversation sample data; and determining the insurance outbound conversation information for the outbound consultation based on the classification result and outputting the insurance outbound conversation information, wherein:

searching for a conversation reply keyword matching the classification result from a preset product conversation word library, wherein the preset product conversation word library stores conversation reply keywords of various classification results; and generating the insurance outbound conversation information containing the conversation reply keyword based on a conversation sentence formulation strategy and outputting the insurance outbound conversation information, wherein the conversation sentence formulation strategy comprises ways to formulate sentences with supplementary text of various genres and parts of speech in combination with the conversation reply keyword, and wherein before the classifying the conversation information with a trained generative large language model to obtain a classification result of the conversation information, the method further comprises:

acquiring historical conversation information, and extracting pieces of conversation sample data from the historical conversation information according to the length of a text sliding window; and determining the crossing area in the conversation sample data and performing deduplication on the crossing area to obtain the training sample set, to train the generative large language model with the training sample set, wherein the crossing area includes time crossing area and text content crossing area, and wherein the determining the crossing area in the conversation sample data and performing deduplication on the crossing area to obtain the training sample set comprises:

performing text analysis on the conversation sample data, comparing text of previous conversation sample data with text of the conversation sample data, and determining the text content crossing area;

deleting target text content corresponding to the text content crossing area, if the target text content is marked as modularized words; and performing deduplication on target text content corresponding to the text content crossing area, if the target text content is marked as non-modularized words, wherein the modularized words are pre-defined text components that do not contribute to the meaning of the conversation information, and wherein the non-modularized words are text components that convey technical content related to conversation context of the conversation information;

formulating the generative large language model to be trained and acquiring the training sample set that has performed deduplication; and training the generative large language model with the training sample set and completing the training of the generative large language model when a loss value of the generative large language model matches a preset loss threshold, wherein the loss value is calculated when the generative large language model is trained with the conversation sample data which has performed deduplication on target text content.

2. The method according to claim 1, wherein before the determining the crossing area in the conversation sample data, the method further comprises:

de-identifying label text corresponding to a sensitive label while the sensitive label is detected in the conversation sample data, wherein the sensitive label is obtained by marking the conversation sample data according to identity sensitive information and insurance amount sensitive information.

3. The method according to claim 1, further comprising:

analyzing intent information of the conversation reply keyword if next round of conversation information still contains the conversation reply keyword, wherein the intent information indicates a secondary consultation object of the insurance product; and retrieving the secondary consultation object that matches the intent information from an insurance product information consultation database, wherein the insurance product information consultation database stores secondary consultation objects corresponding to various intent information.

4. A device for outputting insurance outbound conversation information based on a generative large language model, comprising:

an acquiring circuitry configured to acquire conversation information in outbound consultation on an insurance product;

a processing circuitry configured to classify the conversation information with a trained generative large language model to obtain a classification result of the conversation information, wherein the generative large language model is trained with a training sample set obtained by performing deduplication on crossing area in formulated conversation sample data; and a determining circuitry configured to determine the insurance outbound conversation information for the outbound consultation based on the classification result and output the insurance outbound conversation information, wherein:

searching for a conversation reply keyword matching the classification result from a preset product conversation word library, wherein the preset product conversation word library stores conversation reply keywords of various classification results; and generating the insurance outbound conversation information containing the conversation reply keyword based on a conversation sentence formulation strategy and outputting the insurance outbound conversation information, wherein the conversation sentence formulation strategy comprises ways to formulate sentences with supplementary text of various genres and parts of speech in combination with the conversation reply keyword, and wherein the acquiring circuitry is further configured to acquire historical conversation information, and extract pieces of conversation sample data from the historical conversation information according to the length of a text sliding window; and the determining circuitry is further configured to determine the crossing area in the conversation sample data and perform deduplication on the crossing area to obtain the training sample set, to train the generative large language model with the training sample set, wherein the crossing area includes time crossing area and text content crossing area, and wherein the determining circuitry is further configured to: perform text analysis on the conversation sample data and compare text of previous conversation sample data with text of the conversation sample data to determine the text content crossing area; delete target text content corresponding to the text content crossing area, if the target text content is marked as modularized words; and perform deduplication on target text content corresponding to the text content crossing area, if the target text content is marked as non-modularized words, wherein the modularized words are pre-defined text components that do not contribute to the meaning of the conversation information, and wherein the non-modularized words are text components that convey technical content related to conversation context of the conversation information;

formulating the generative large language model to be trained and acquiring the training sample set that has performed deduplication; and training the generative large language model with the training sample set and completing the training of the generative large language model when a loss value of the generative large language model matches a preset loss threshold, wherein the loss value is calculated when the generative large language model is trained with the conversation sample data which has performed deduplication on target text content.

5. A non-transitory computer storage medium storing computer executable instructions, and the computer executable instructions causes a processor to perform the method according to claim 1.

* * * * *